(12) United States Patent
Doi et al.

(10) Patent No.: US 12,506,548 B2
(45) Date of Patent: Dec. 23, 2025

(54) BASE STATION, METHOD FOR BASE STATION, AND COMPUTER READABLE MEDIUM

(71) Applicant: NEC Corporation, Tokyo (JP)

(72) Inventors: Takanobu Doi, Tokyo (JP); Kazushi Muraoka, Tokyo (JP); Naoto Ishii, Tokyo (JP); Jun Shikida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 18/222,584

(22) Filed: Jul. 17, 2023

(65) Prior Publication Data

US 2024/0106550 A1  Mar. 28, 2024

(30) Foreign Application Priority Data

Sep. 28, 2022  (JP) ................ 2022-154623

(51) Int. Cl.
*H04B 17/21* (2015.01)
*H04B 17/336* (2015.01)

(52) U.S. Cl.
CPC .......... *H04B 17/21* (2015.01); *H04B 17/336* (2015.01)

(58) Field of Classification Search
CPC .............................. H04B 17/21; H04B 14/336
See application file for complete search history.

(56) References Cited

U.S. PATENT DOCUMENTS

| | | | | |
|---|---|---|---|---|
| 2014/0369283 A1* | 12/2014 | Ge | ........ | H04W 72/541 370/329 |
| 2015/0139009 A1* | 5/2015 | Park | ........ | H04W 72/542 370/252 |
| 2019/0349789 A1* | 11/2019 | Zeng | ........ | H04L 1/0003 |
| 2023/0254090 A1* | 8/2023 | Miranda | ........ | H04L 5/0055 370/329 |

FOREIGN PATENT DOCUMENTS

JP  2015-502114 A  1/2015

OTHER PUBLICATIONS

J.Lee, R.Arnott, K.Hamabe, and N.Takano, "Adaptive Modulation Switching Level Control in High Speed Downlink Packet Access Transmission", 3G Mobile Communication Technologies, May 8-10, 2002.

* cited by examiner

*Primary Examiner* — Zhiren Qin

(57) ABSTRACT

A base station, a method for a base station, and a program capable of appropriately selecting radio terminals for which spatial multiplexing is performed and an MCS, and thereby increasing throughput in multi-user MIMO are provided. A base station 11 according to the present disclosure includes: a correction parameter storage unit 1141 configured to store a plurality of correction parameters for each of a plurality of radio terminals 12, the plurality of correction parameters being provided for each of the radio terminals 12; a correction parameter selection unit 1131 configured to select a predetermined correction parameter from among the plurality of correction parameters based on a combination of radio (Continued)

terminals 12 that are spatially multiplexed in the same radio resource; a correction value calculation unit 1132 configured to calculate a correction value of the radio terminal 12 based on the predetermined correction parameter.

13 Claims, 8 Drawing Sheets

BASE STATION, METHOD FOR BASE STATION, AND COMPUTER READABLE MEDIUM

INCORPORATION BY REFERENCE

This application is based upon and claims the benefit of priority from Japanese patent application No. 2022-154623, filed on Sep. 28, 2022, the disclosure of which is incorporated herein in its entirety by reference.

TECHNICAL FIELD

The present disclosure relates to a base station, a method for a base station, and a program, and in particular to a base station, a method for a base station, and a program capable of appropriately selecting radio terminals for which spatial multiplexing is performed and an MCS, and thereby increasing throughput in multi-user MIMO.

BACKGROUND ART

As a method for realizing large-volume communication, multi-user MIMO (Multi-Input Multi-Output), in which a base station including a plurality of antennas simultaneously performs wireless communication with a plurality of radio terminals (user terminals), has been well-known. The multi-user MIMO is used, for example, for a multiple-access cellular system such as a fifth-generation (5G) mobile communication system. In the multi-user MIMO, a plurality of radio terminals transmit and receive radio signals (layers) in the same radio resource by spatially multiplexing these signals (layers). Therefore, depending on the combination of radio terminals and layers for which spatial multiplexing is performed, in some cases, interference therebetween becomes larger and the reception signal to interference and noise power ratio (SINR: Signal to Interference and Noise power Ratio) deteriorates, thus causing the throughput to decrease.

Therefore, radio terminals and layers for which spatial multiplexing is performed are selected by scheduling in order to improve the reception SINR. In the scheduling, it is necessary to predict the reception SINR of each layer for each combination of radio terminals and layers for which spatial multiplexing is performed. In general, the prediction of the reception SINR is repeatedly performed, so that the amount of calculation thereof increases. Therefore, as the calculation for predicting the reception SINR, a rough estimation is made by using a method requiring a small amount of calculation (a small-amount calculation) for one calculation. When the method requiring a small amount of calculation is used, it is difficult to maintain high accuracy, so that, in some cases, the actual reception SINR significantly differs from the roughly-estimated reception SINR. As a technology for compensating for a difference between a roughly-estimated reception SINR and an actual reception SINR, there is a technology called outer loop link adaptation (OLLA: Outer Loop Link Adaptation). In the OLLA, an OLLA correction value is added to a roughly-estimated reception SINR. This OLLA correction value is determined based on the successful and failed receptions of transmitted data signals. Therefore, it can help to keep an error rate R at or near a predetermined value. It is possible to improve the spectrum efficiency of the communication system by appropriately selecting radio terminals for which spatial multiplexing is performed and a modulation and coding scheme (MCS: Modulation and Coding Scheme) by using the OLLA-corrected reception SINR. The OLLA correction value is also referred to simply as a correction value.

As a known OLLA method, a Method 1 is disclosed in J. Lee, R. Arnott, K. Hamabe, and N. Takano, "Adaptive Modulation Switching Level Control in High Speed downlink Packet Access Transmission", 3G Mobile Communication Technologies, 8-10 May 2002. The Method 1 is a method for correcting, in single-user transmission, a reception SINR threshold used in MCS selection by using a correction value. Correcting a reception SINR threshold by a correction value is equivalent to the above-described correction of a reception SINR by a correction value. Each radio terminal has one correction value. Then, when a transmission data signal has been successfully received, the correction value is increased by a value $\alpha_{Up}$, whereas when the reception of a transmission data signal has failed, the correction value is decreased by a value $\alpha_{Down}$. Here, a target error rate in the scheduling is represented by $R_{Target}$. Then, by setting $\alpha_{Up}$ and $\alpha_{Down}$ so that a relation $\alpha_{Up}$: $\alpha_{Down}=R_{Target}:(1-R_{Target})$ holds, it is possible to help to keep the error rate at or near $R_{Target}$. This is because when transmission is performed N times with the error rate being at or near $R_{Target}$, on average, transmission succeeds $N \times (1-R_{Target})$ times and fails $N \times R_{Target}$ times, so that the amount of adjustment obtained by the success and the amount of adjustment obtained by the failure become equal to each other as expressed as $\alpha_{Up} \times N \times (1-R_{Target}) = \alpha_{Down} \times N \times R_{Target}$. However, the single-user transmission is assumed in the Method 1, so that it is difficult to appropriately conform to the correction value that changes depending on the presence/absence of an interfering terminal.

Published Japanese Translation of PCT International Publication for Patent Application, No. 2015-502114 discloses a Method 2 as another known OLLA method. The Method 2 makes it possible to effectively conform to the target in both single-user transmission and multi-user transmission by using different offset correction values for the single-user transmission and multiuser transmission. However, in the case of multi-user transmission, the reception SINR is corrected by the same offset correction value irrespective of the combination of interfering terminals. Therefore, when the combination of radio terminals for which spatial multiplexing is performed is frequently switched by the scheduling process, it is difficult to effectively conform to the target by using an appropriate correction value.

As described above, in the Methods 1 and 2, it is difficult to make the OLLA offset effectively conform to the target when radio terminals for which spatial multiplexing is performed are switched in the multi-user MIMO. As a result, in the Methods 1 and 2, there is a problem that the ability of correcting the reception SINR deteriorates when the combination of radio terminals for which spatial multiplexing is performed changes.

An object of the present disclosure is to provide a base station, a method for a base station, and a program capable of solving the above-described problem.

SUMMARY

A base station according to the present disclosure includes:
- a correction parameter storage unit configured to store a plurality of correction parameters for each of a plurality of radio terminals, the plurality of correction parameters being provided for each of the radio terminals;
- a correction parameter selection unit configured to select a predetermined correction parameter from among the plurality of correction parameters based on a combination of radio terminals that are spatially multiplexed in the same radio resource;
a correction value calculation unit configured to calculate a correction value of the radio terminal based on the predetermined correction parameter;
a reception SINR correction unit configured to add the correction value to a roughly-estimated reception SINR; and
a correction parameter update unit configured to adjust the predetermined correction parameter based on success/failure of reception of a transmitted data signal, and thereby update the already-stored predetermined correction parameter.

A method for a base station according to the present disclosure includes: storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

A program according to the present disclosure causes a computer to perform:
storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

BRIEF DESCRIPTION OF DRAWINGS

The above and other aspects, features and advantages of the present disclosure will become more apparent from the following description of certain exemplary example embodiments when taken in conjunction with the accompanying drawings, in which.

EXAMPLE EMBODIMENT

An example embodiment according to the present disclosure will be described hereinafter with reference to the drawings. Components corresponding to or the same as each other are assigned the same or corresponding numerical numbers (or symbols) throughout the drawings, and redundant descriptions thereof are omitted as appropriate for clarifying the explanation.

First Example Embodiment

<Outline of Base Station>

Figure 1:
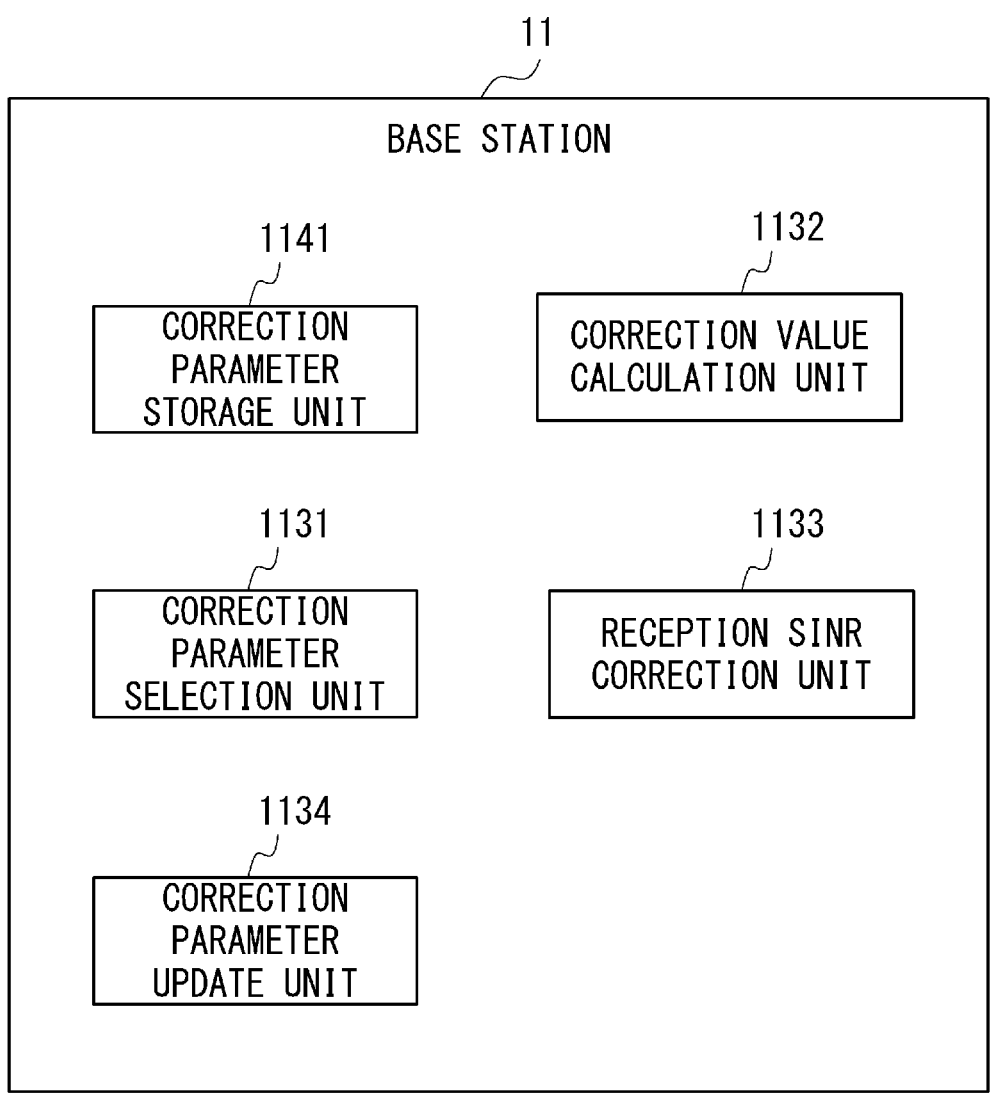
FIG. 1 is a block diagram showing an example of a base station according to a first example embodiment.

FIG. 1 is a block diagram showing an example of a base station according to a first example embodiment.

FIG. 1 is a block diagram showing an example of the minimum configuration of the base station.

As shown in FIG. 1, the base station 11 according to the first example embodiment includes a correction parameter storage unit 1141, a correction parameter selection unit 1131, a correction value calculation unit 1132, a reception SINR correction unit 1133, and a correction parameter update unit 1134.

The correction parameter storage unit 1141 stores a plurality of correction parameters, which are provided for each of radio terminals 12, for each of the radio terminals 12. The correction parameter selection unit 1131 selects a predetermined correction parameter from among the plurality of correction parameters based on a combination of radio terminals 12 that are spatially multiplexed in the same radio resource (i.e., a combination of radio terminals 12 for which spatial multiplexing is performed in the same radio resource).

The correction value calculation unit 1132 calculates a correction value for the radio terminals 12 based on the predetermined correction parameter. The reception SINR correction unit 1133 adds the correction value to a roughly-estimated reception SINR. The correction parameter update unit 1134 adjusts, based on the success/failure of reception of a transmitted data signal(s), the predetermined correction parameter, and thereby updates the already-stored predetermined correction parameter.

<Configuration of System>

Figure 2:
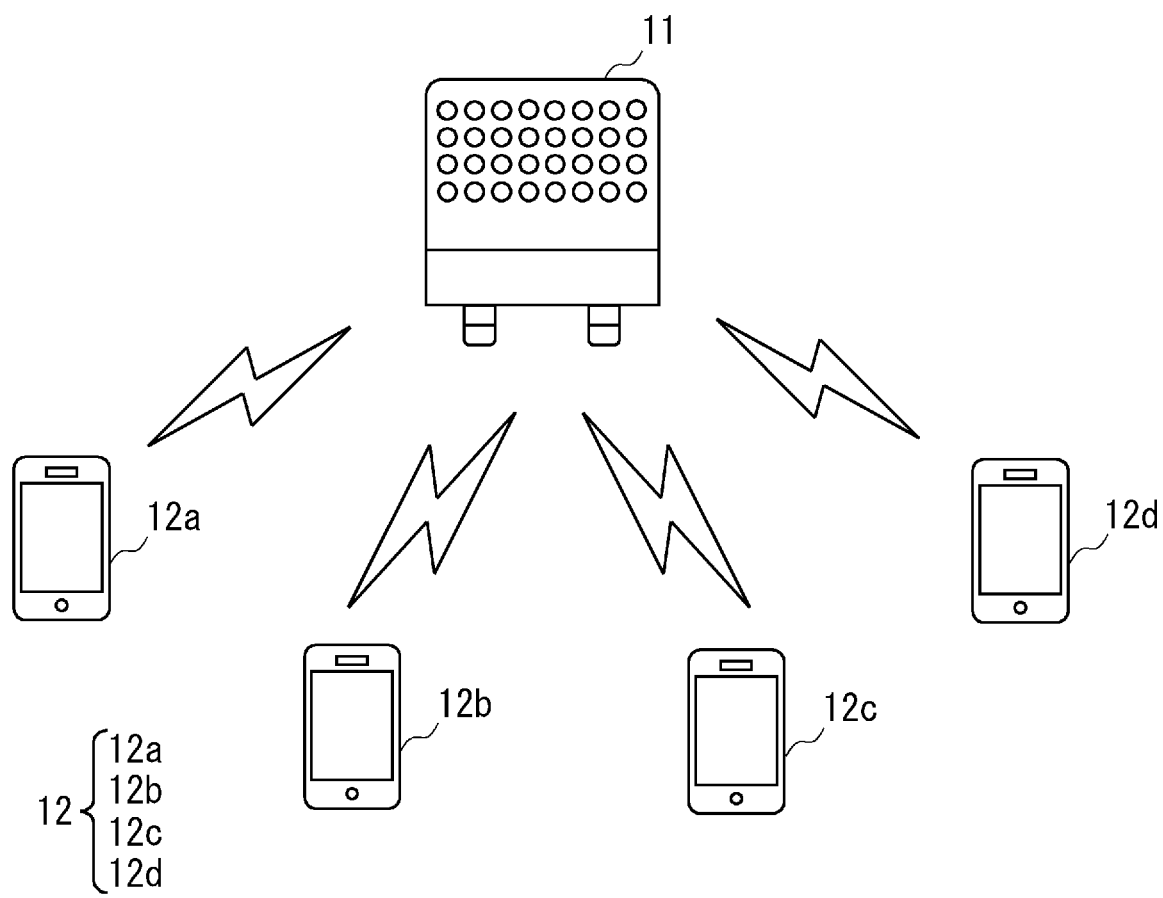
FIG. 2 is a block diagram showing an example of a radio communication system according to the first example embodiment.

FIG. 2 is a block diagram showing an example of a radio communication system according to the first example embodiment.

In FIG. 2, as the radio terminals 12, radio terminals 12a, 12b, 12c and 12d are shown as examples.

As shown in FIG. 2, the radio communication system 10 includes a base station 11 and a plurality of radio terminals (user terminals) 12. The base station 11 wirelessly accesses the plurality of radio terminals 12. The base station is also referred to as an access point (AP: Access Point) or a transmission/reception point (TRP: Transmission/Reception Point), and also referred to by other names. The base station 11 may be, for example, a gNB (Node B), an RU (Radio Unit), or a DU (Distributed Unit) in a 5G system.

In some implementations, the radio communication system 10 uses a multi-user MIMO technology for uplink communication from the plurality of radio terminals 12 to the base station 11. In this case, the base station 11 receives a reference signal from each of the plurality of radio terminals 12, infers a MIMO channel between each of the plurality of radio terminals 12 and the base station 11 by using the reference signal, and selects, from among a plurality of layers in which the plurality of radio terminals 12 can transmit signals (i.e., from among streams of radio signals that can be simultaneously transmitted), a plurality of layers which are spatially-multiplexed in the same radio resource and are transmitted in a spatially-multiplexed manner. Further, the base station 11 may detect a transmission signal transmitted from a radio terminal 12 by using a data signal received from the selected plurality of layers and the inferred channel. That is, the base station 11 may perform MIMO detection in order to separate multi-user signals of the selected plurality of radio terminals 12.

<Operation of Scheduler>

Figure 3:
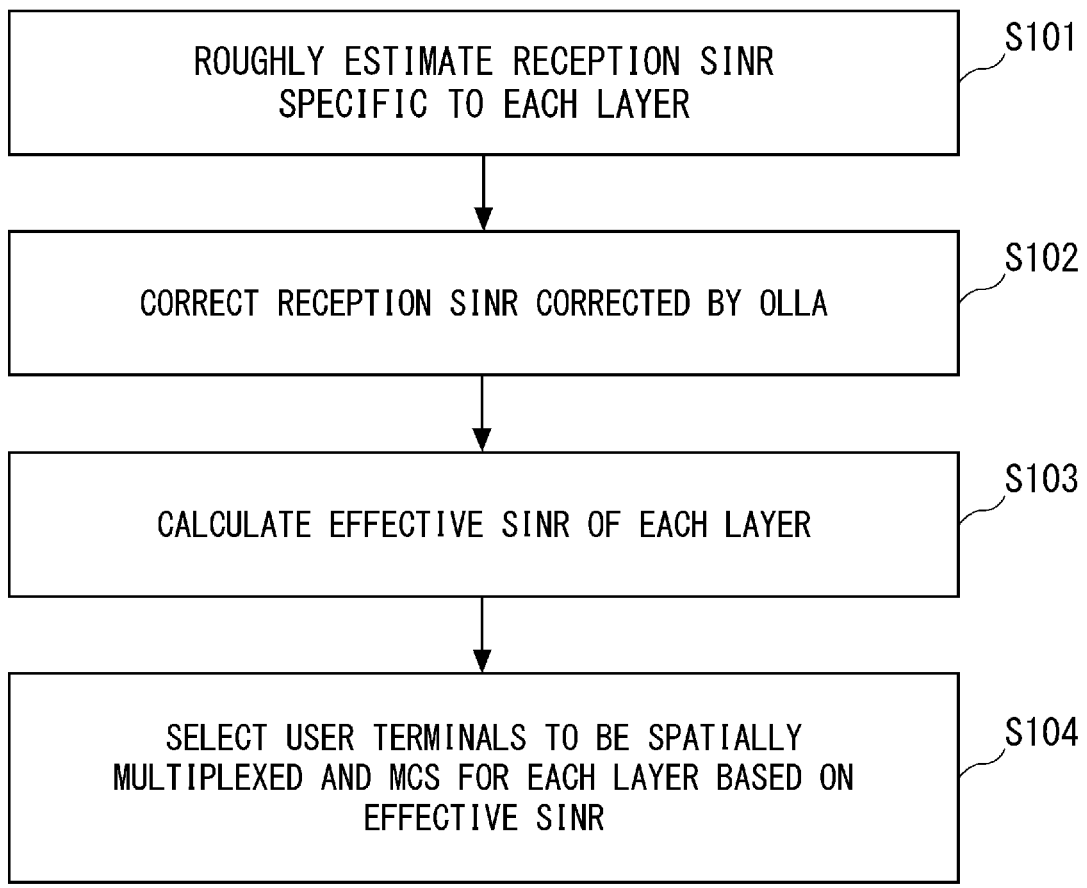
FIG. 3 is a flowchart showing an example of operations performed by a scheduler according to the first example embodiment.

FIG. 3 is a flowchart showing an example of operations performed by a scheduler according to the first example embodiment.

FIG. 3 is a flowchart showing an example of a procedure for adaptive MCS selection and spatially-multiplexed terminal selection in the scheduler of the base station 11.

As shown in FIG. 3, in a step S101, the base station 11 makes a rough estimate of each layer-specific reception SINR. Note that in the downlink, the reception SINR may be roughly estimated by using a channel inferred by using a reference signal transmitted from the radio terminal 12, or a reception SINR roughly estimated in a radio terminal 12 may be reported to the base station 11.

In a step S102, the reception SINR is corrected by OLLA.

In a step S103, an effective SINR is calculated for each link (for each layer). Note that the effective SINR is, when layers are assigned to a plurality of resource blocks (RBs: Resource Blocks), the SINR of the whole RBs to which the layers are assigned.

In a step S104, radio terminals 12 for which spatial multiplexing is performed and the MCS of each layer are selected based on the effective SINR.

<Detailed Base Station Configuration 1>

Figure 4:
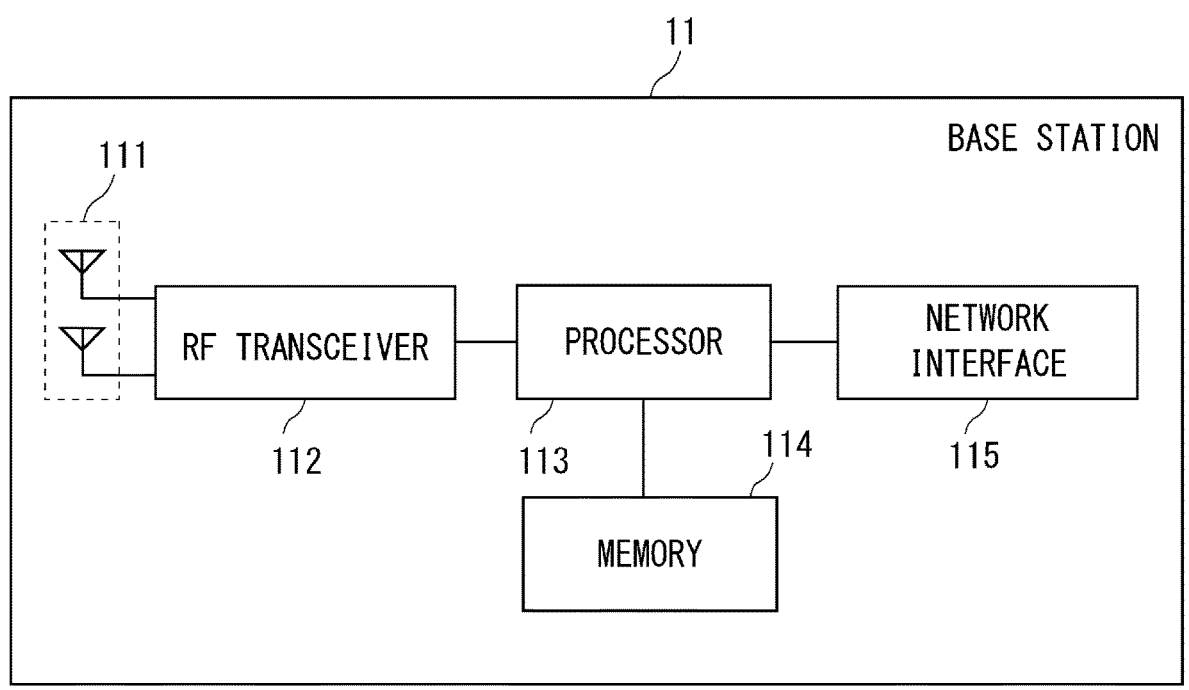
FIG. 4 is a block diagram showing an example of a configuration of a base station according to the first example embodiment.

FIG. 4 is a block diagram showing an example of a configuration of the base station according to the first example embodiment.

As shown in FIG. 4, the base station 11 includes an antenna array 111, an RF (Radio Frequency) transceiver 112, a processor 113, a memory 114, and a network interface 115.

The RF transceiver 112 performs analog RF signal processing in order to communicate with a plurality of radio terminals 12. The RF transceiver 112 may include a plurality of transceivers. The RF transceiver 112 is connected to the antenna array 111 and the processor 113. The RF transceiver 112 receives a transmission signal from the processor 113, generates a transmission RF signal, and supplies the generated transmission RF signal to the antenna array 111. Further, the RF transceiver 112 generates a baseband reception signal based on a reception RF signal received by the antenna array 111, and supplies the generated baseband reception signal to the processor 113.

The processor 113 performs digital baseband signal processing (data plane processing) and control plane processing for radio communication. The processor 113 may include a plurality of processors. The plurality of processors 113 may include, for example, a modem processor (e.g., CPU: Central Processing Unit), a GPU (Graphics Processing Unit), or a DSP (Digital Signal Processor) that performs the digital baseband processing, and a protocol stack-processor (e.g., a CPU or an MPU (Micro Processing Unit) that performs the control plane processing.

The digital baseband signal processing performed by the processor 113 may include, for example, signal processing in an SDAP (Service Data Adaptation Protocol) layer, a PDCP (Packet Data Convergence Protocol) layer, an RLC (Radio Link Control) layer, a MAC (Medium Access Control) layer, and a PHY (Physical) layer. Further, the control plane processing performed by the processor 113 may include, for example, processing of NAS (Non-Access Stratum) messages, RRC (Radio Resource Control) messages, MAC (Medium Access Control) CEs (Control Elements), and DCI (Downlink Control Information).

The network interface 115 is used to communicate with network nodes (e.g., other base stations, a CU (Centralized Unit), a core network node, and the like). The network interface 115 may include, for example, a network interface card (NIC: Network Interface Card) in conformity to IEEE 802.3 series.

The memory 114 is a combination of a volatile memory and a nonvolatile memory. The volatile memory is, for example, an SRAM (Static Random Access Memory), a DRAM (Dynamic RAM), or a combination thereof. The nonvolatile memory is an MROM (Mask Read Only Memory), an EEPROM (Electrically Erasable Programmable ROM), a flash memory, a hard disk drive, or any combination thereof. The memory 114 may include a storage located remotely from the processor 113. In this case, the processor 113 may access the memory 114 through the network interface 115 or other I/O (Input/Output) interfaces.

The memory 114 may include a computer readable medium storing at least one software module (a computer program) including instructions and data for performing at least a part of the processing performed by the base station 11. In some implementations, the processor 113 may be constructed so as to perform at least a part of the processing performed by the base station 11 described in the above-described example embodiment by loading the software module from the memory 114 and executing the loaded software module.

<Detailed Base Station Configuration 2>

Figure 5:
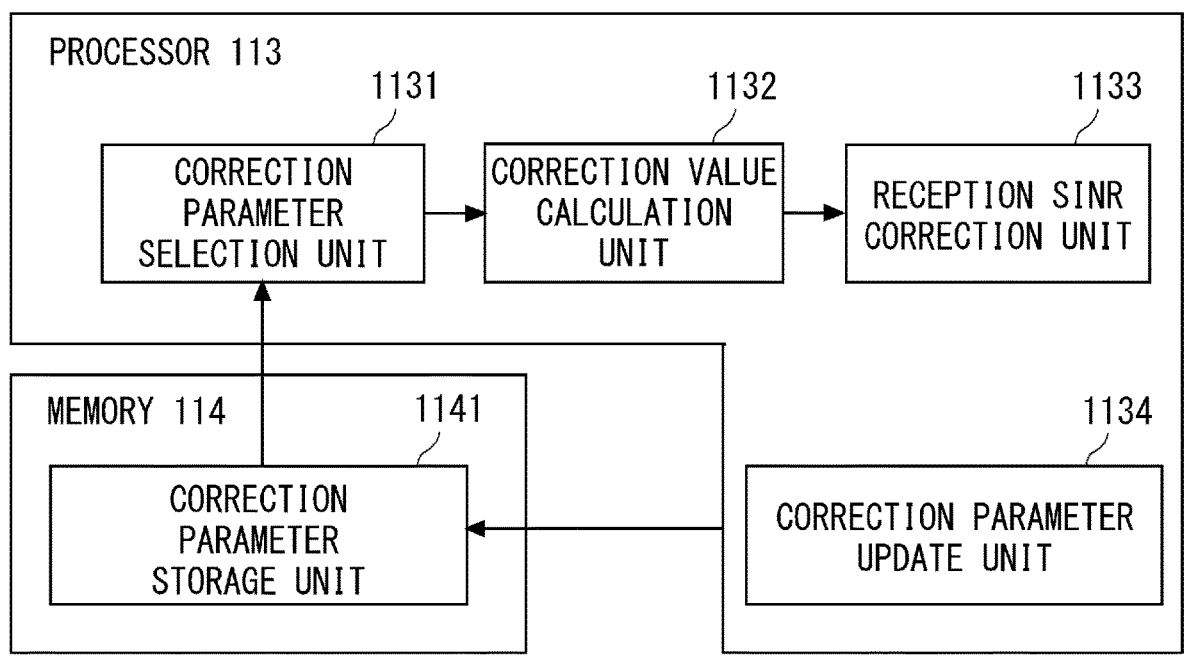
FIG. 5 is a block diagram showing an example of a configuration of a processor and a memory included in the base station according to the first example embodiment.

FIG. 5 is a block diagram showing an example of a configuration of a processor and a memory included in the base station according to the first example embodiment.

When FIG. 5 is compared with FIG. 1, it can be understood that all the components shown in FIG. 1 are included in the processor 113 or the memory 114 shown in FIG. 5.

The processor 113 can make the base station 11 perform processing for OLLA. To do so, as shown in FIG. 5, the processor 113 includes a correction parameter selection unit 1131, a correction value calculation unit 1132, a reception SINR correction unit 1133, and a correction parameter update unit 1134. The memory 114 includes a correction parameter storage unit 1141. Further, in the following description, for simplicity, it is assumed that a radio terminal performs transmission by using one layer, and in the case where transmission is performed by using a plurality of layers, each of the layers may be implemented by a respective radio terminal.

The correction parameter storage unit 1141 stores a plurality of correction parameters, which are provided for each of radio terminals 12, for each of the radio terminals 12. Reference to FIG. 2, a plurality of correction parameters are prepared for each of radio terminals 12a, 12b, 12c and 12d, and the correction parameter storage unit 1141 stores the plurality of correction parameters for each of the radio terminals 12. As shown in FIG. 5, the correction parameter storage unit 1141 connects to the correction parameter selection unit 1131 and supplies a correction parameter(s) to the correction parameter selection unit 1131.

The correction parameter selection unit 1131 selects (acquires) a (predetermined) correction parameter from among the plurality of correction parameters, which are stored for each of the radio terminals 12 in the correction parameter storage unit 1141, based on a combination of radio terminals 12 that are spatially multiplexed in the same radio resource (i.e., a combination of radio terminals 12 for which spatial multiplexing is performed in the same radio resource). As shown in FIG. 5, the correction parameter selection unit 1131 connects to the correction value calculation unit 1132 and supplies the selected (predetermined) correction parameter to the correction value calculation unit 1132.

A first implementation example of the correction parameter storage unit 1141 and the correction parameter selection unit 1131 will be shown hereinafter. In the first implementation example, a correction parameter included in the correction parameter storage unit 1141 is specified based on a combination of a radio terminal 12m, for which a correction is to be made, and other radio terminals 12mm that is spatially multiplexed with the radio terminal 12m in the same radio resource. Specifically, a correction parameter of an mth radio terminal 12m is specified by a set $\Omega$ of indices of other radio terminals 12mm spatially multiplexed with the radio terminal 12m in the same radio resource, and is expressed as $\delta_{m,\Omega}$. The correction parameter selection unit 1131 selects, from among the correction parameters of the mth radio terminal 12m, a correction parameter corresponding to the set of the other radio terminals 12mm spatially multiplexed with the radio terminal 12m in the same radio resource. For example, in the case where spatial multiplexing is performed for the first, third, fourth and seventh radio terminals 12, $\delta_{3,\{1,4,7\}}$ is selected as the correction parameter of the third radio terminal 12. Note that the set $\Omega$ is set to $\{1, 4, 7\}$.

Note that for each of the radio terminal 12m, for which a correction is to be made, and the other radio terminals 12mm, one of the correction parameters included in the correction parameter storage unit 1141 is associated with that radio terminal.

A second implementation example of the correction parameter storage unit 1141 and the correction parameter selection unit 1131 will be shown hereinafter. In the second implementation example, the correction parameter of an mth radio terminal 12m is specified by an m'th radio terminal 12m', and is expressed as $\delta_{m,m'}$. The correction parameter selection unit 1131 selects, from among the correction parameters of the mth radio terminal 12m, a correction parameter corresponding to the radio terminal number of the radio terminal spatially multiplexed with the radio terminal 12m in the same radio resource. For example, in the case where spatial multiplexing is performed for the first, third, fourth and seventh radio terminals 12, $\delta_{3,3}$ is selected as the correction parameter of the third radio terminal 12 itself, and $\delta_{3,1}$, $\delta_{3,4}$, and $\delta_{3,7}$ are selected as the correction parameters of the interfering terminals. Further, the above-described features are merely some of the implementation examples of the correction parameter storage unit 1141 and the correction parameter selection unit 1131, and the implementation according to the present disclosure is not limited to the above-described implementation examples.

The correction value calculation unit 1132 calculates the correction value $\Delta_m$ of the mth radio terminal 12m based on the (predetermined) correction parameter received from the correction parameter selection unit 1131, which is the (predetermined) correction parameter selected by the correction parameter selection unit 1131. The correction value calculation unit 1132 connects to the reception SINR correction unit 1133 and supplies the correction value $\Delta_m$ of the mth radio terminal 12m to the reception SINR correction unit 1133.

In the case of the first implementation example of the correction parameter storage unit 1141 and the correction parameter selection unit 1131, the correction value calculation unit 1132 uses the correction parameter $\delta_{m,\Omega}$ selected by the correction parameter selection unit 1131 as the correction value $\Delta_m$ as shown by the below-shown Expression (1).

$$\Delta_m = \delta_{m,\Omega} \quad (1)$$

In the second implementation example of the correction parameter storage unit 1141 and the correction parameter selection unit 1131, the correction value calculation unit 1132 receives the correction parameter $\delta_{m,m'}$ selected by the correction parameter selection unit 1131 and outputs the correction value $\Delta_m$. The correction value calculation unit 1132 uses the correction value $\Delta_m$ as the sum total of the selected plurality of correction parameters $\delta_{m,m'}$ as shown by the below-shown Expression (2).

$$\Delta_m = \delta_{m,m} + \Sigma_{m' \in \Omega} \delta_{m,m'} \quad (2)$$

In the second implementation example of the correction value calculation unit 1132, the correction value $\Delta_m$ may be the sum of correction parameters $\delta_{m,m}$ of the mth radio terminal 12m and the average of correction parameters $\delta_{m,m'}$ of the interfering terminals (the other radio terminals 12mm) as shown by the below-shown Expression (3).

$$\Delta_m = \delta_{m,m} + (1/|\Omega|) \times \Sigma_{m' \in \Omega} \delta_{m,m'} \quad (3)$$

Note that the symbol "/" in Expression (3) represents a division.

Note that the symbol "/" in Expressions (10) and (11) (which will be described later) also represents a division.

Note that $|\Omega|$ is the number of elements of the set SI. Further, the above-described features are merely some of the implementation examples of the correction value calculation unit 1132, and the implementation according to the present disclosure is not limited to the above-described implementation examples.

The reception SINR correction unit 1133 adds the correction value $\Delta_m$ received from the correction value calculation unit 1132, which is the correction value calculated by the correction value calculation unit 1132, to the reception SINR $\gamma_m$ of the mth radio terminal 12 roughly-estimated by the base station 11. Specifically, the correction (addition) is performed as shown by the below-shown Expression (4).

$$\gamma'_m = \gamma_m + \Delta_m \quad (4)$$

The reception SINR correction unit 1133 supplies the corrected reception SINR $\gamma'_m$ to the scheduler (not shown) disposed inside the base station 11. The base station 11 performs scheduling based on the supplied corrected reception SINR $\gamma'_m$, and transmits and receives a data signal(s).

The correction parameter update unit 1134 adjusts (corrects) the (predetermined) correction parameter selected by the correction parameter selection unit 1131 based on the success/failure of reception (reception result) of the transmitted data signal and updates the (predetermined) correction parameter already-stored in the correction parameter storage unit 1141. When the transmitted data signal has been successfully received, the correction parameter is adjusted as shown by the below-shown Expression (5). Further, when the reception of the transmitted data signal has failed, the correction parameter is adjusted as shown by the below-shown Expression (6).

$$\delta' = \delta + \alpha_{Up} \tag{5}$$

$$\delta' = \delta - \alpha_{Down} \tag{6}$$

In the expression, $\delta$ is the correction parameter selected in the correction parameter selection unit 1131, and $\delta'$ is the adjusted correction parameter. Further, $\alpha_{Up}$ is an adjusting amount (updating amount) when the transmitted data signal has been successfully received, and $\alpha_{Down}$ is an adjusting amount (updating amount) when the reception of the transmitted data signal has failed. When the target error rate in the scheduling is represented by $R_{Target}$, $\alpha_{Up}$ and $\alpha_{Down}$ are as shown by the below-shown Expressions (7) and (8).

$$\alpha_{Up} = R_{Target} \times \alpha \tag{7}$$

$$\alpha_{Down} = (1 - R_{Target}) \times \alpha \tag{8}$$

In the expression, $\alpha$ is a parameter for controlling the adjusting amount. By setting the adjusting amount as described above, in N times of data signal transmission with the error rate R being equal to or close to $R_{Target}$, the amount of upward adjustment of the parameter and the amount of downward adjustment thereof become roughly equal to each other as shown by the below-shown Expression (9). Therefore, the correction parameter is adjusted so that the error rate R converges to the target.

$$\alpha_{Up} \times (N \times (1-R)) * (N \times R) \tag{9}$$

While the operations that are performed when the radio terminals 12 for which spatial multiplexing is performed in all the resource blocks (RBs: Resource Blocks) in the same time slot are unchanged have been described so far in the above description, combinations of radio terminals 12 that are spatially multiplexed in RBs different from each other in the same time slot may be different from each other. In this case, a different correction parameter is selected in each of RBs. In the correction parameter update unit 1134, the parameter $\alpha$ for controlling the adjusting amount (updating amount) by which the correction parameter is adjusted may have a different value in each of the radio terminals 12. Further, the parameter $\alpha$ for controlling the adjusting amount may have a different value in each of the RBs.

As a first implementation example, as shown by the below-shown Expression (10), a value obtained by dividing a control parameter $\alpha_0$ common to all the radio terminals 12 by the number $N_{RB,i}$ of RBs to which the radio terminal 12, for which a correction is to be made, is assigned (i.e., a value based on the reciprocal of the number of RBs) may be used. Note that i is an index of the radio terminal 12, for which a correction is to be made.

$$\alpha = \alpha_0 / N_{RB,i} \tag{10}$$

As a second implementation example, as shown by the below-shown Expression (11), as the control parameter $\alpha$ in the RB for which the combination of spatially-multiplexed radio terminals 12 is $\Omega$, a value obtained by dividing the common control parameters $\alpha_0$ by the number $N_{RB,\Omega}$ of other spatially-multiplexed RBs in the combination $\Omega$ in the same time slot (i.e., a value based on the reciprocal of the number of RBs) may be used.

$$\alpha = \alpha_0 / N_{RB,\Omega} \tag{11}$$

<Operation of Base Station>

Figure 6:
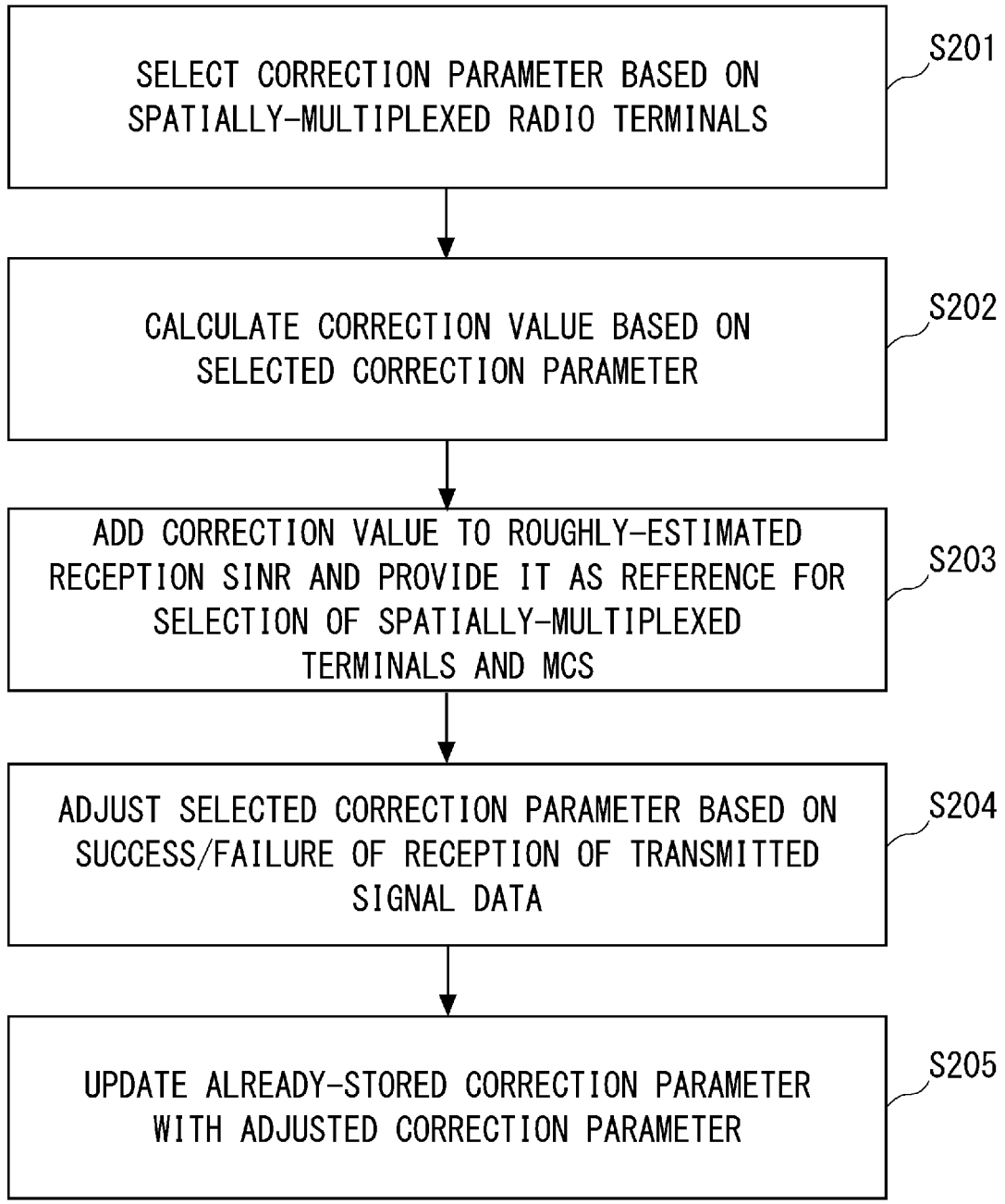
FIG. 6 is a flowchart showing an example of operations performed by the base station according to the first example embodiment.

FIG. 6 is a flowchart showing an example of operations performed by the base station according to the first example embodiment.

FIG. 6 shows an example of OLLA operations performed by a processor and a memory of the base station.

As shown in FIG. 6, in a step S201, the processor 113 (e.g., the correction parameter selection unit 1131) selects a (predetermined) correction parameter from the memory 114 (e.g., the correction parameter storage unit 1141) based on the spatially-multiplexed radio terminals 12.

In a step S202, the processor 113 (e.g., the correction value calculation unit 1132) calculates a correction value based on the selected correction parameter.

In a step S203, the processor 113 (e.g., the reception SINR correction unit 1133) adds the correction value to the roughly-estimated reception SINR and supplies the resultant value to the base station 11 as a reference for the selection of spatially-multiplexed terminals and the MCS.

In a step S204, the processor 113 (e.g., the correction parameter update unit 1134) adjusts the correction parameter selected in the step S201 based on the success/failure of reception of a transmitted data signal(s).

In a step S205, the processor 113 (e.g., the correction parameter update unit 1134) updates the correction parameter already-stored in the memory 114 (e.g., the correction parameter storage unit 1141) with the correction parameter adjusted in the step S204.

<Effect>

In the first example embodiment, it is possible to, by selecting the above-described correction parameter based on the spatially-multiplexed radio terminals 12, use different OLLA correction values depending on the combination of spatially-multiplexed radio terminals 12. In this way, even when the combination of spatially-multiplexed radio terminals 12 is frequently changed by the scheduler, it is possible to set an appropriate OLLA correction value each time the combination of radio terminals 12 is changed, and thereby to effectively correct the roughly-estimated reception SINR.

As a result, it is possible to provide a base station, a method for a base station, and a program capable of appropriately selecting radio terminals for which spatial multiplexing is performed and an MCS, and thereby increasing throughput in multi-user MIMO.

Further, it is possible to, by changing the adjusting amount according to the number of RBs allocated to the radio terminals 12, update the correction parameter by roughly the same adjusting amount in the unit-time slot irrespective of the number of allocated RBs, and so that the correction parameter does not change in an excessive manner, thus enabling the stable operation.

Second Example Embodiment

<Detailed Configuration of Base Station>

Figure 7:
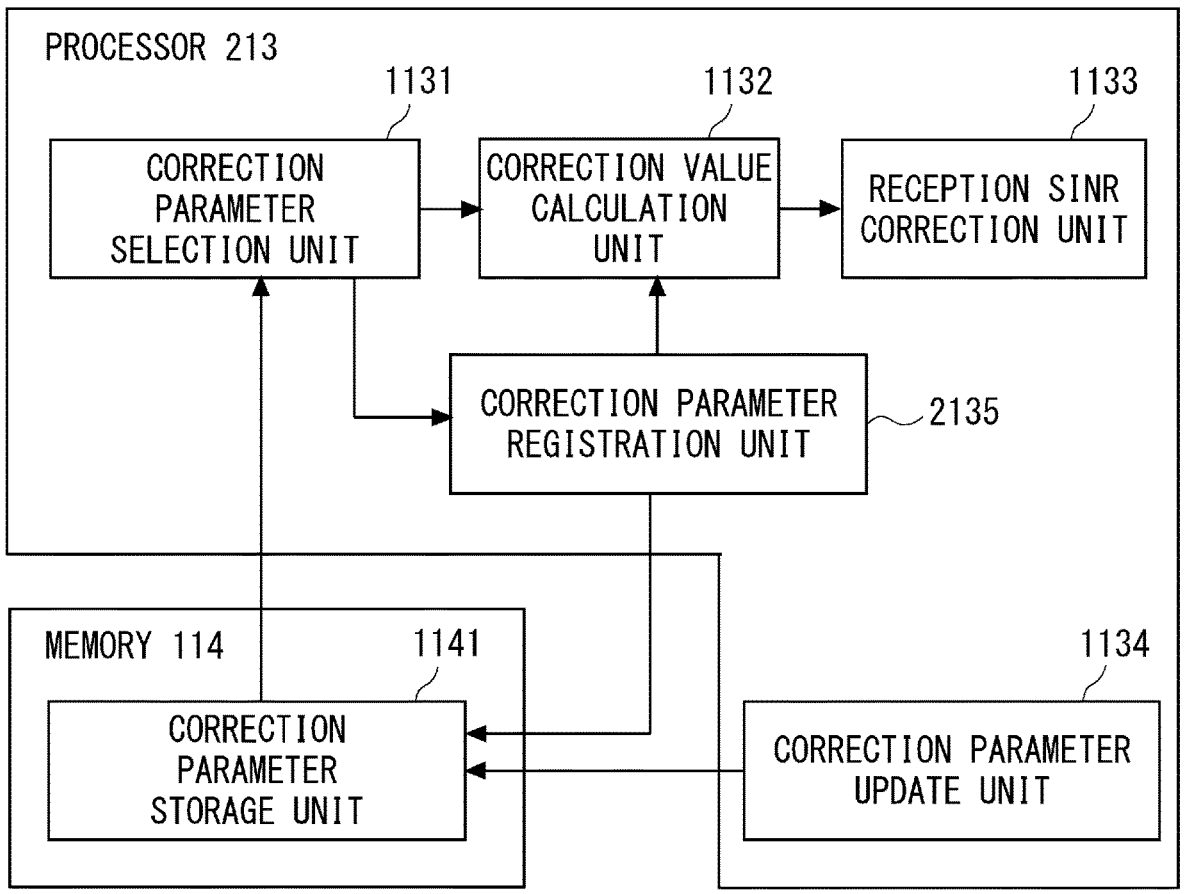
FIG. 7 is a block diagram showing an example of a configuration of a processor and a memory of a base station according to a second example embodiment.

FIG. 7 is a block diagram showing an example of a configuration of a processor and a memory included in a base station according to a second example embodiment.

When FIG. 7 is compared with FIG. 5, the processor 213 of the base station 21 according to the second example embodiment differs from the processor 113 of the base station 11 according to the first example embodiment because a correction parameter registration unit 2135 is added in the processor 213.

As shown in FIG. 7, the correction parameter selection unit 1131 connects to a correction parameter storage unit 1141, a correction value calculation unit 1132, and a correction parameter registration unit 1135, and selects a (predetermined) correction parameter from the correction parameter storage unit 1141 based on the spatially-multiplexed radio terminals 12. When the (predetermined) correction parameter to be selected has already been registered (stored) in the correction parameter storage unit 1141, the selected correction parameter is supplied to the correction value calculation unit 1132 as in the case of the first example embodiment. When the correction parameter to be selected is not registered in the correction parameter storage unit 1141, a set of spatially-multiplexed radio terminals 12 is supplied to a correction parameter registration unit 1135.

The correction parameter registration unit 1135 connects to the correction parameter storage unit 1141, the correction parameter selection unit 1131, and the correction value calculation unit 1132.

When the correction parameter corresponding to the combination of spatially-multiplexed radio terminals 12, which have been used to transmit a data signal, is not registered in the correction parameter storage unit 1141, the correction parameter registration unit 1135 generates a new correction parameter. Specifically, the correction parameter registration unit 1135 generates a new correction parameter based on a user terminal number supplied from the correction parameter selection unit 1131.

The correction parameter registration unit 1135 deletes some of the correction parameters registered in the correction parameter storage unit 1141 based on the number of correction parameters registered therein or the storage capacity for registered correction parameters, and registers the new correction parameter. Specifically, as shown by the below-shown Expressions (12) and (13), the correction parameter registration unit 1135 additionally registers a correction parameter initialized to an arbitrary value $\delta_m^{Init}$ in the correction parameter storage unit 1141, and supplies it to the correction value calculation unit 1132.

$$\delta_{m,\Omega} = \delta_m^{Init} \quad (12)$$

$$\delta_{m,m'} = \delta_m^{Init} \quad (13)$$

Note that, in the first implementation example, $\delta_{m,\Omega}$ is the correction parameter used by the correction parameter storage unit 1141 and the correction parameter selection unit 1131. Further, in the second implementation example, $\delta_{m,m'}$ is the correction parameter used by the correction parameter storage unit 1141 and the correction parameter selection unit 1131.

Note that when the memory of the correction parameter storage unit 1141 is fully used, a correction parameter(s) already registered in the correction parameter storage unit 1141 is first deleted, and then the new correction parameter is registered therein. For example, the correction parameter(s) to be deleted is a correction parameter(s) that was selected earlier than any of the other correction parameters.

In the first implementation example, the initial value $\delta_m^{Init}$ of the correction parameter is, for example, a constant such as zero.

In the second implementation example, the initial value $\delta_m^{Init}$ of the correction parameter is a value that changes over time. For example, one $\delta_m^{Init}$ is registered for each radio terminal 12 in the correction parameter storage unit 1141 and is adjusted based on the success/failure of reception of a transmitted data signal(s) as shown by the below-shown Expressions (14) and (15).

$$\delta_m^{Init'} = \delta_m^{Init} + \alpha_{Up} \quad (14)$$

$$\delta_m^{Init'} = \delta_m^{Init} - \alpha_{Down} \quad (15)$$

That is, the initial value $\delta_m^{Init}$ is adjusted irrespective of the combination of spatially-multiplexed radio terminals 12.

In the third implementation example, the initial value $\delta_m^{Init}$ of the correction parameter is a value that changes over time and changes based on the combination of radio terminals 12 for which spatial multiplexing is performed. For example, the initial value is the correction value in the second implementation example of the first example embodiment.

In the second and third implementation examples, the initial value may be adjusted based on the success/failure of reception of all data signals transmitted by the radio terminals 12. That is, the initialization parameter for initializing the new correction parameter generated by the correction parameter registration unit 1135 may be adjusted based on the success/failure of reception of transmitted data signals.

Further, the initial value may be adjusted based solely on the success/failure of reception of a transmitted data signal(s) that has been transmitted as a result of the scheduling using the generated new correction parameter. Further, the above-described features are merely some of the examples of the initialization, and the implementation according to the present disclosure is not limited to the above-described examples.

<Operation of Base station>

Figure 8:
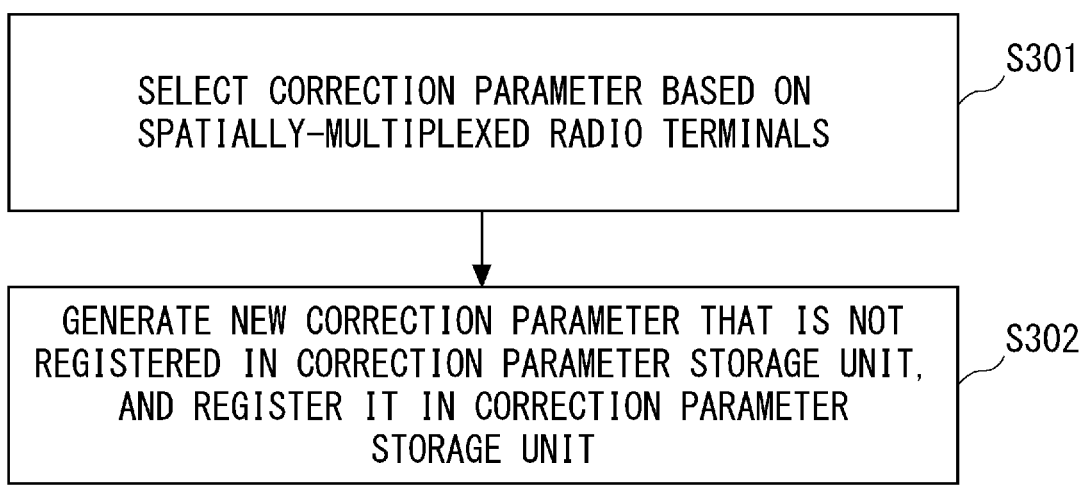
FIG. 8 is a flowchart showing an example of operations performed by the base station according to the second example embodiment.

FIG. 8 is a flowchart showing an example of operations performed by the base station according to the second example embodiment.

FIG. 8 shows an example of OLLA operations performed by a processor and a memory of the base station.

FIG. 8 shows an example of operations performed by the correction parameter selection unit 1131 and the correction parameter registration unit 1135.

As shown in FIG. 8, in a step S301, the processor 113 (e.g., the correction parameter selection unit 1131) selects a correction parameter based on the spatially-multiplexed radio terminals 12.

In a step S302, the processor 113 (e.g., the correction parameter registration unit 1135) generates a new correction parameter that is not registered in the memory 114 (e.g., the correction parameter storage unit 1141), and registers the generated new correction parameter in the memory 114 (e.g., the correction parameter storage unit 1141).

<Effect>

In the second example embodiment, the correction parameter storage unit 1141 is constructed solely by the correction parameter corresponding to the combination of spatially-multiplexed radio terminals used in the actual transmission, so that the memory size can be reduced. Therefore, even when the number of radio terminals 12 that connect to the base station 11 is large and the memory size increases as the first example embodiment is applied, the correction parameter storage unit 1141 can be constructed by a memory having a small memory size.

Note that although the present disclosure is described as a hardware configuration in the above-described example embodiments, the present disclosure is not limited to the hardware configurations. In the present disclosure, the processes in each of the components can also be implemented by having a CPU (Central Processing Unit) execute a computer program.

In the above-described example embodiments, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a radio communication line.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

Further, although operations are described in a specific order, this should not be understood that they need to be performed in the above-shown specific or sequential order in order to achieve the desired result, or all of the above-shown operations need to be performed. In certain situations, multi-tasking and parallel processing may be advantageous. Similarly, although the details of some specific example embodiments are included in the discussion above, they should be interpreted not as a restriction on the scope of the present disclosure but as an explanation of features unique to the specific example embodiments. Specific features described in the context of individual example embodiments may be implemented in combination in one example embodiment. Conversely, various features described in the context of one example embodiment may be implemented separately in a plurality of example embodiments, or may be implemented in any suitable combination thereof.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

Note that the present disclosure is not limited to the above-described example embodiments, and they may be modified as appropriate without departing from the scope and spirit of the disclosure.

The whole or part of the example embodiments disclosed above can be described as, but not limited to, the following supplementary notes.

(Supplementary Note 1)

A base station comprising:

a correction parameter storage unit configured to store a plurality of correction parameters for each of a plurality of radio terminals, the plurality of correction parameters being provided for each of the radio terminals;

a correction parameter selection unit configured to select a predetermined correction parameter from among the plurality of correction parameters based on a combination of radio terminals that are spatially multiplexed in the same radio resource;

a correction value calculation unit configured to calculate a correction value of the radio terminal based on the predetermined correction parameter;

a reception SINR correction unit configured to add the correction value to a roughly-estimated reception SINR; and a correction parameter update unit configured to adjust the predetermined correction parameter based on success/failure of reception of a transmitted data signal, and thereby update the already-stored predetermined correction parameter.

(Supplementary Note 2)

The base station described in Supplementary note 1, wherein the correction parameter stored in the correction parameter storage unit is specified based on a combination of the radio terminal, for which a correction is to be made, and another radio terminal that is spatially multiplexed with the radio terminal, for which the correction is to be made, in the same radio resource.

(Supplementary Note 3)

The base station described in Supplementary note 2, wherein the correction value calculation unit uses the predetermined correction parameter selected by the correction parameter selection unit as the correction value.

(Supplementary Note 4)

The base station described in Supplementary note 1, wherein for each of the radio terminal, for which a correction is to be made, and the other radio terminal, one of the correction parameters stored in the correction parameter storage unit is associated with that radio terminal.

(Supplementary Note 5)

The base station described in Supplementary note 4, wherein the correction value calculation unit uses a sum total of the plurality of predetermined correction parameters selected by the correction parameter selection unit as the correction value.

(Supplementary Note 6)

The base station described in Supplementary note 4, wherein the correction value calculation unit uses a sum of an average of the correction parameters of the other radio terminal among the plurality of predetermined correction parameters selected by the correction parameter selection unit, and the correction parameter of the radio terminal as the correction value.

(Supplementary Note 7)

The base station described in any one of Supplementary notes 1 to 3, further comprising a correction parameter registration unit configured to, when the correction parameter corresponding to the combination of the spatially-multiplexing radio terminals, used for the transmission of the data signal is not registered in the correction parameter storage unit, generate a new correction parameter, delete at least one of the correction parameters registered in the correction parameter storage unit based on the number of correction parameters registered therein or a storage capacity for the registered correction parameters, and registers the generated new correction parameter.

(Supplementary Note 8)

The base station described in Supplementary notes 7, wherein an initialization parameter for initializing the new correction parameter generated by the correction parameter registration unit is adjusted based on success/failure of reception of the transmitted data signal.

(Supplementary Note 9)

The base station described in any one of Supplementary notes 1 to 6, wherein the correction parameter update unit:
increases, when the transmitted data signal has been successfully received, in scheduling, the correction parameter is increased by an amount equivalent to a product of a target error rate of the data signal and an updating amount, and
decreases, when the transmitted data signal has failed, the correction parameter is decreased by an amount equivalent to a product of a value obtained by subtracting a target error rate of the data signal from one and the updating amount.

(Supplementary Note 10)

The base station described in Supplementary note 9, wherein the updating amount is determined based on a reciprocal of the number of resource blocks for which the radio terminal, for which a correction is to be made, is assigned in the same time slot.

(Supplementary Note 11)

The base station described in Supplementary note 9, wherein the updating amount is determined for each combination of spatially multiplexed radio terminals, and a combination of spatially-multiplexed radio terminals in a unit-time slot is determined based on a reciprocal of the number of allocated resource blocks.

(Supplementary Note 12)

A method for a base station, comprising:
storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

(Supplementary Note 13)

A program for causing a computer to perform:
storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

According to the present disclosure, it is possible to provide a base station, a method for a base station, and a program capable of appropriately selecting radio terminals for which spatial multiplexing is performed and an MCS, and thereby increasing throughput in multi-user MIMO.

REFERENCE SIGNS LIST

10 RADIO COMMUNICATION SYSTEM
11 BASE STATION
12, 12a, 12b, 12c, 12d RADIO TERMINAL
12m mth RADIO TERMINAL
12mm OTHER RADIO TERMINAL SPATIALLY MULTIPLEXED WITH RADIO TERMINAL 12m IN SAME RADIO RESOURCE
111 ANTENNA ARRAY
112 RF TRANSCEIVER
113 PROCESSOR
1131 CORRECTION PARAMETER SELECTION UNIT
1132 CORRECTION VALUE CALCULATION UNIT
1133 RECEPTION SINR CORRECTION UNIT
1134 CORRECTION PARAMETER UPDATE UNIT
1135 CORRECTION PARAMETER REGISTRATION UNIT
114 MEMORY
1141 CORRECTION PARAMETER STORAGE UNIT
115 NETWORK INTERFACE

What is claimed is:

1. A base station comprising:
a correction parameter storage unit configured to store a plurality of correction parameters for each of a plurality of radio terminals, the plurality of correction parameters being provided for each of the radio terminals;
a correction parameter selection unit configured to select a predetermined correction parameter from among the plurality of correction parameters based on a combination of radio terminals that are spatially multiplexed in the same radio resource;
a correction value calculation unit configured to calculate a correction value of the radio terminal based on the predetermined correction parameter;
a reception SINR correction unit configured to add the correction value to a roughly-estimated reception SINR; and
a correction parameter update unit configured to adjust the predetermined correction parameter based on success/failure of reception of a transmitted data signal, and thereby update the already-stored predetermined correction parameter.

2. The base station according to claim 1, wherein the correction parameter stored in the correction parameter storage unit is specified based on a combination of the radio terminal, for which a correction is to be made, and another radio terminal that is spatially multiplexed with the radio terminal, for which the correction is to be made, in the same radio resource.

3. The base station according to claim 2, wherein the correction value calculation unit uses the predetermined correction parameter selected by the correction parameter selection unit as the correction value.

4. The base station according to claim 1, wherein for each of the radio terminal, for which a correction is to be made, and the other radio terminal, one of the correction parameters stored in the correction parameter storage unit is associated with that radio terminal.

5. The base station according to claim 4, wherein the correction value calculation unit uses a sum total of the plurality of predetermined correction parameters selected by the correction parameter selection unit as the correction value.

6. The base station according to claim 4, wherein the correction value calculation unit uses a sum of an average of the correction parameters of the other radio terminal among the plurality of predetermined correction parameters selected by the correction parameter selection unit, and the correction parameter of the radio terminal as the correction value.

7. The base station according to claim 1, further comprising a correction parameter registration unit configured to, when the correction parameter corresponding to the combination of the spatially-multiplexing radio terminals, used for the transmission of the data signal is not registered in the correction parameter storage unit, generate a new correction parameter, delete at least one of the correction parameters registered in the correction parameter storage unit based on the number of correction parameters registered therein or a storage capacity for the registered correction parameters, and registers the generated new correction parameter.

8. The base station according to claim 7, wherein an initialization parameter for initializing the new correction parameter generated by the correction parameter registration unit is adjusted based on success/failure of reception of the transmitted data signal.

9. The base station according to claim 1, wherein the correction parameter update unit:
increases, when the transmitted data signal has been successfully received, in scheduling, the correction parameter is increased by an amount equivalent to a product of a target error rate of the data signal and an updating amount, and
decreases, when the transmitted data signal has failed, the correction parameter is decreased by an amount equivalent to a product of a value obtained by subtracting a target error rate of the data signal from one and the updating amount.

10. The base station according to claim 9, wherein the updating amount is determined based on a reciprocal of the number of resource blocks for which the radio terminal, for which a correction is to be made, is assigned in the same time slot.

11. The base station according to claim 9, wherein the updating amount is determined for each combination of spatially multiplexed radio terminals, and a combination of spatially-multiplexed radio terminals in a unit-time slot is determined based on a reciprocal of the number of allocated resource blocks.

12. A method for a base station, comprising:
storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

13. A non-transitory computer readable medium storing a program for causing a computer to perform:
storing a plurality of correction parameters for each of a plurality of radio terminals, the plurality of correction parameters being provided for each of the radio terminals;
selecting a predetermined correction parameter from among the plurality of correction parameters based on a combination of radio terminals that are spatially multiplexed in the same radio resource;
calculating a correction value of the radio terminal based on the predetermined correction parameter;
adding the correction value to a roughly-estimated reception SINR; and
adjusting the predetermined correction parameter based on success/failure of reception of a transmitted data signal, and thereby updating the already-stored predetermined correction parameter.

* * * * *